United States Patent
Sato et al.

(10) Patent No.: US 8,414,837 B2
(45) Date of Patent: Apr. 9, 2013

(54) SELECTIVE REDUCTION CATALYST

(75) Inventors: Shinya Sato, Tokyo (JP); Yoshihiro Kawada, Tokyo (JP); Mitsuru Hosoya, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 12/734,377

(22) PCT Filed: Oct. 27, 2008

(86) PCT No.: PCT/JP2008/069401
§ 371 (c)(1),
(2), (4) Date: Apr. 28, 2010

(87) PCT Pub. No.: WO2009/057536
PCT Pub. Date: May 7, 2009

(65) Prior Publication Data
US 2010/0254862 A1 Oct. 7, 2010

(30) Foreign Application Priority Data
Nov. 1, 2007 (JP) .................. 2007-284810

(51) Int. Cl.
*B01D 50/00* (2006.01)
(52) U.S. Cl.
USPC ........................................ 422/171
(58) Field of Classification Search .............. 422/177, 422/180; 502/60, 71, 106
See application file for complete search history.

(56) References Cited

U.S. PATENT DOCUMENTS

| | | | |
|---|---|---|---|
| 5,981,026 A | 11/1999 | Bode et al. | 428/116 |
| 2003/0069125 A1* | 4/2003 | Tissler et al. | 502/60 |
| 2007/0134145 A1 | 6/2007 | Strehlau et al. | 423/213.5 |
| 2007/0173404 A1 | 7/2007 | Kureti et al. | 502/316 |
| 2007/0248517 A1 | 10/2007 | Nagata et al. | 423/213.5 |
| 2007/0259770 A1 | 11/2007 | Hofmann et al. | 502/60 |

FOREIGN PATENT DOCUMENTS

| | | |
|---|---|---|
| EP | 0 202 540 A1 | 11/1986 |
| EP | 1 815 909 A1 | 8/2007 |
| EP | 1 852 174 A1 | 11/2007 |
| JP | 10-252455 A | 9/1998 |
| JP | 3442898 B2 | 6/2003 |
| JP | 3763586 B2 | 4/2006 |

(Continued)

OTHER PUBLICATIONS

Office Action issued Aug. 17, 2011, in Chinese Patent Application No. 200880112687.0.

(Continued)

*Primary Examiner* — Tom Duong
(74) *Attorney, Agent, or Firm* — Kubovcik & Kubovcik (57) ABSTRACT

A first porous catalytic layer is provided in an exhaust passage, and a second porous catalytic layer is stacked on the exhaust-gas downstream-side surface of the first layer. The first layer includes an iron-zeolite catalyst to decrease 60% or more of NOx in the exhaust gas within an exhaust gas temperature range of 150-400° C. The second layer includes one or more of a single catalyst, a mixed catalyst, and a complex oxide catalyst selected from iron-alumina, iron-zirconia, iron-ceria, and iron-titania, to decrease 60% or more of NOx in the exhaust gas within an exhaust gas temperature range of 400-700° C. The first and second layers cooperatively exhibit catalytic activity to decrease 70% or more of NOx in the exhaust gas within an exhaust gas temperature range of 150 to 700° C.

3 Claims, 3 Drawing Sheets

FOREIGN PATENT DOCUMENTS

| | | |
|---|---|---|
| JP | 2007-501353 A | 1/2007 |
| JP | 2007-296521 A | 11/2007 |
| WO | 2005/016497 A1 | 2/2005 |
| WO | 2006/011575 A1 | 2/2006 |

OTHER PUBLICATIONS

European Search Report dated Feb. 28, 2012, issued in Appln. No. 08845386.5-2104.

K. Rahkamaa-Tolonen, et al., "The effect of $NO_2$ on the activity of fresh and aged zeolite catalysts in the $NH_3$-SCR reaction" Catalysis Today vol. 100, pp. 217-222 (2005).

Sato S. et al., "The study of NOx reduction using Urea-SCR system for a heavy diesel engine" Preprints of Meeting on Automotive Engineers, May 21, 2003, No. 25-03, pp. 19-22.

Chinese Office Action dated Jun. 27, 2012, issued in Appln. No. 200880112687.0 and English translation thereof.

\* cited by examiner

SELECTIVE REDUCTION CATALYST

This application is a 371 of international application PCT/JP2008/069401, filed Oct. 27, 2008, which claims priority based on Japanese patent application No. 2007-284810 filed Nov. 1, 2007, which is incorporated herein by reference.

TECHNICAL FIELD

The present invention relates to a selective reduction catalyst for decreasing nitrogen oxides contained in an exhaust gas of a diesel engine by reacting the nitrogen oxides with a urea-based liquid.

BACKGROUND ART

Conventionally, an emission treatment system has been disclosed which is suitable for treating an exhaust stream containing NOx and particulate matter (see patent document 1, for example). This emission treatment system includes an oxidation catalyst; an injector in fluid communication with and downstream of the oxidation catalyst, wherein the injector periodically meters ammonia or an ammonia precursor into the exhaust stream; and a wall flow monolith in fluid communication with and downstream of the injector. The wall flow monolith has a plurality of longitudinally extending passages formed by longitudinally extending walls bounding and defining the passages. Here, the wall flow monolith comprises an SCR catalyst composition that permeates the walls at a concentration of at least 1.3 g/in$^3$, and the wall flow monolith has a wall porosity of at least 50% with an average pore size of at least 5 µm. Further, the SCR catalyst composition comprises: a base metal component selected from one or more of copper and iron components; and a zeolite; and the zeolite has a silica to alumina ratio of at least about 10. This SCR catalyst composition is deposited onto inlet passages and outlet passages of the wall flow monolith, and then dried and fired.

In the thus constituted emission treatment system, the SCR catalyst composition is capable of effectively catalyzing the reduction of NOx components at temperatures lower than 600° C., and is also capable of aiding in the regeneration of the monolith acting as a filter by lowering the temperature at which the soot fraction of the particulate matter is combusted. Further, the SCR catalyst composition catalyzes a reaction of $O_2$ with somewhat excessively present $NH_3$ to generate $N_2$ and $H_2O$ so that $NH_3$ is not emitted into the atmosphere, and the SCR catalyst composition is configured to withstand temperatures exceeding 650° C. Here, those zeolites, which are highly resistant to sulfate poisoning and provide good activity for both the SCR process and the oxidation of ammonia with oxygen, and which retain good activity even when subject to high temperatures, hydrothermal conditions and sulfate poisons, are zeolites having pores which exhibit a pore diameter of at least about 7 angstroms and which are interconnected in three dimensions. It is said to be believed that at the interconnection of pores of at least 7 angstroms diameter in three dimensions provides for good mobility of sulfate molecules throughout the zeolite structure, thereby permitting the sulfate molecules to be released from the catalyst to free a large number of the available adsorbent sites for reactant NOx and $NH_3$ molecules and reactant $NH_3$ and $O_2$ molecules. Note that examples of zeolites satisfying such criteria include USY zeolite (ultrastable Y-type zeolite), beta zeolite (alumino silicate comprising pores defined by three-dimensionally twelve-membered rings), and the like.

Patent document 1: Japanese Patent Application Laid-Open Publication No. 2007-501353 (claims 1, 5, 6, and 12; paragraphs [0035], [0036], and [0038])

DISCLOSURE OF INVENTION

Problem to be Solved by the Invention

Although the conventional emission treatment system described in the patent document 1 is said to be able to withstand temperatures higher than 650° C., the system is problematic in that the system is still insufficient in heat resistance under high-temperature hydrothermal conditions, and the system fails to sufficiently reduce NOx components in hot atmospheres higher than 650° C. It is therefore an object of the present invention to provide a selective reduction catalyst capable of ensuring a NOx decreasing capability over a wide temperature range from low to high temperatures of exhaust gas. It is another object of the present invention to provide a selective reduction catalyst capable of ensuring a NOx decreasing capability even when an interior of its carrier is brought into a high-temperature hydrothermal environment upon combustion of particulates accumulated in the carrier.

Means for Solving Problem

Figure 1:
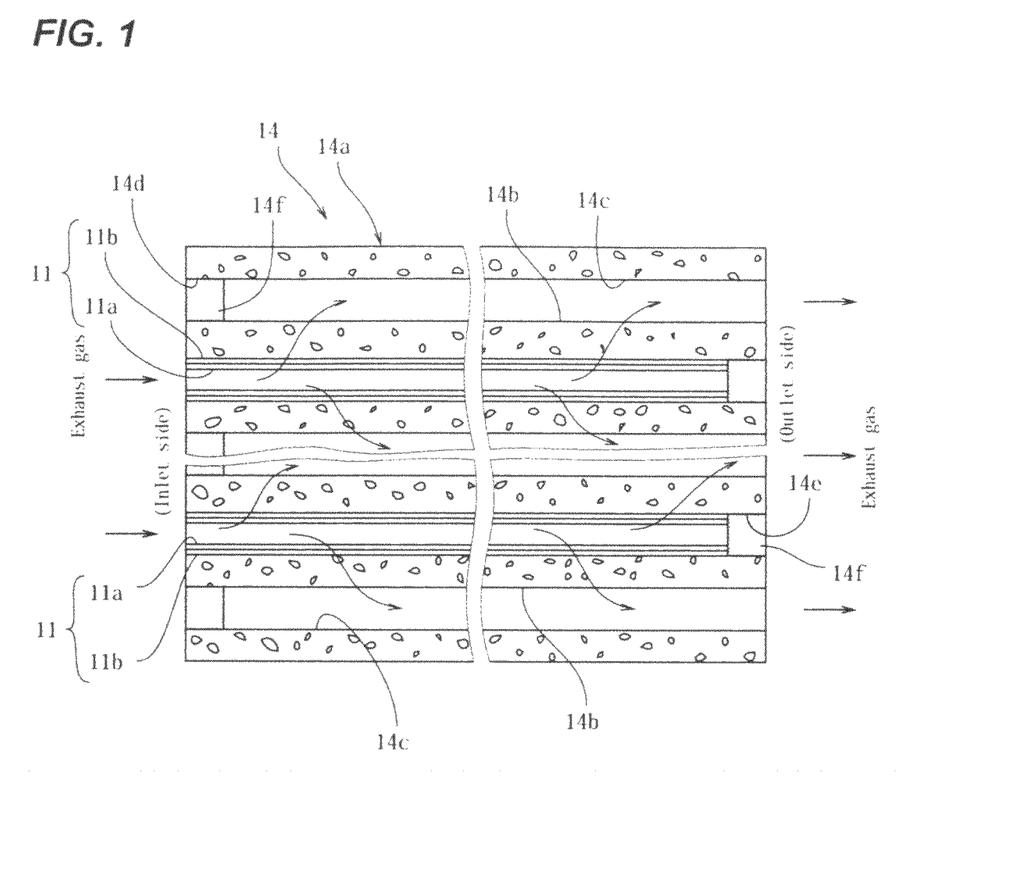
FIG. 1 is a cross-sectional constitutional view of a selective reduction catalyst according to a first embodiment of the present invention.

The invention according to claim 1 resides in a selective reduction catalyst as shown in FIG. 1, comprising:

a first catalytic layer 11a, which is provided in an exhaust passage 13, and which is formed to be porous for allowing an exhaust gas to pass therethrough; and a second catalytic layer 11b, which is stacked on the exhaust-gas downstream-side surface of the first catalytic layer 11a, and which is formed to be porous for allowing the exhaust gas to pass therethrough;

wherein the first catalytic layer 11a comprises an iron-zeolite catalyst to exhibit catalytic activity to decrease 60% or more of NOx contained in the exhaust gas within an exhaust-gas temperature range of 150 to 400° C.;

wherein the second catalytic layer 11b comprises one or more kinds of a single catalyst, a mixed catalyst, and a complex oxide catalyst selected from a group consisting of iron-alumina, iron-zirconia, iron-ceria, and iron-titania, in a manner to exhibit catalytic activity to decrease 60% or more of NOx contained in the exhaust gas within an exhaust-gas temperature range of 400 to 700° C. which range is higher than the temperature range where the first catalytic layer 11a exhibits the catalytic activity; and wherein both the first and second catalytic layers 11a and 11b cooperatively exhibit catalytic activity to decrease 70% or more of NOx contained in the exhaust gas within an exhaust-gas temperature range of 150 to 700° C.

According to the selective reduction catalyst recited in claim 1, when the exhaust passage 13 is supplied with the urea-based liquid 16b at a low exhaust gas temperature between 150 to 400° C., the urea-based liquid 16b is hydrolyzed to produce ammonia; and when the exhaust gas together with the ammonia flows into the first catalytic layer 11a, the ammonia functions as a reducing agent, so that NO and $NO_2$ in the exhaust gas are reduced by the first catalytic layer 11a with higher efficiency and converted into $N_2$, $H_2O$, and the like, thereby resultingly enabling to decrease an emission amount of NOx into the atmosphere. At this time, the excessive ammonia ($NH_3$) is trapped by the first catalytic layer 11a, without reacting with NOx. Meanwhile, when the exhaust gas temperature is elevated up to 400° C. or higher, the excessive ammonia having been trapped in the first catalytic layer 11a is released from the first catalytic layer 11a, and flows into the second catalytic layer 11b, together with the ammonia derived from hydrolysis of the urea-based liquid 16b supplied into the exhaust passage 13. Although a relatively large amount of ammonia is required for the second catalytic layer 11b to exhibits higher catalytic activity at high temperatures, ammonia in the relatively large amount as described above is caused to flow into the second catalytic layer 11b, so that NO and $NO_2$ in the exhaust gas are reduced by the second catalytic layer 11b with higher efficiency and converted into $N_2$, $H_2O$, and the like, thereby resultingly enabling to decrease an emission amount of NOx into the atmosphere. As a result, both the first and second catalytic layers 11a and 11b are capable of cooperatively decreasing NOx contained in the exhaust gas over a wide range of 150 to 700° C., with higher efficiency.

The invention according to claim 2 resides in the invention according to claim 1, as further shown in FIG. 1, wherein the exhaust passage 13 is provided with a carrier 14a therein, and the carrier 14a has multiple through-holes 14c divided off by porous partitions 14b and mutually parallelly extended in a longitudinal direction of the exhaust passage 13; and wherein the second catalytic layer 11b is stacked on each of the exhaust-gas upstream-side surfaces of the partitions 14b, and the first catalytic layer 11a is stacked on the surface of the second catalytic layer 11b. According to the selective reduction catalyst recited in claim 2, NOx in the exhaust gas is decreased by the first catalytic layer 11a comprising the iron-zeolite catalyst at low temperatures with higher efficiency, and is decreased by the second catalytic layer 11b comprising an iron-alumina catalyst or the like at high temperatures with higher efficiency, identically to the above. Further, when particulates in an exhaust gas are accumulated up to a predetermined amount in the carrier 14a, the carrier 14a is brought into an environment which is hot and pervaded with a water vapor such that the iron-zeolite catalysts is somewhat degraded under the high-temperature hydrothermal condition; however, the second catalytic layer 11b comprising an iron-alumina catalyst or the like is interposedly provided which is insusceptible to be degraded under the high-temperature hydrothermal condition and exhibits excellent performance at high temperatures, so that the performance in the high temperature range is rarely deteriorated.

The invention according to claim 3 resides in a selective reduction catalyst comprising:

a first catalytic particle, which is provided in an exhaust passage, and which is formed to be porous for allowing an exhaust gas to pass therethrough; and a second catalytic particle, which is mixed with the first catalytic particle, and which is formed to be porous for allowing the exhaust gas to pass therethrough;

wherein the first catalytic particle comprises an iron-zeolite catalyst, to exhibit catalytic activity to decrease 60% or more of NOx contained in the exhaust gas within an exhaust-gas temperature range of 150 to 400° C.;

wherein the second catalytic particle comprises one or more kinds of a single catalyst, a mixed catalyst, and a complex oxide catalyst selected from a group consisting of iron-alumina, iron-zirconia, iron-ceria, and iron-titania, in a manner to exhibit catalytic activity to decrease 60% or more of NOx contained in the exhaust gas within an exhaust-gas temperature range of 400 to 700° C. which range is higher than the temperature range where the first catalytic particle exhibits the catalytic activity; and wherein both the first and second catalytic particles cooperatively exhibit catalytic activity to decrease 70% or more of NOx contained in the exhaust gas within an exhaust-gas temperature range of 150 to 700° C.

According to the selective reduction catalyst recited in claim 3, when the exhaust passage is supplied with the urea-based liquid at a low exhaust gas temperature between 150 to 400° C., the urea-based liquid is hydrolyzed to produce ammonia; and when the exhaust gas together with the ammonia flows into or contacts with the first catalytic particle, the ammonia functions as a reducing agent, so that NO and $NO_2$ in the exhaust gas are reduced by the first catalytic particle with higher efficiency and converted into $N_2$, $H_2O$, and the like, thereby resultingly enabling to decrease an emission amount of NOx into the atmosphere. At this time, the excessive ammonia ($NH_3$) is trapped by the first catalytic particle, without reacting with NOx. Meanwhile, when the exhaust gas temperature is elevated up to 400° C. or higher, the excessive ammonia having been trapped in the first catalytic particle is released from the first catalytic particle, and flows into or contacts with the second catalytic particle near the first catalytic particle, together with the ammonia derived from hydrolysis of a urea-based liquid supplied into the exhaust passage. Although a relatively large amount of ammonia is required for the second catalytic particle to exhibit higher catalytic activity at high temperatures, ammonia in the relatively large amount as described above is caused to flow into or contact with the second catalytic particle, so that NO and $NO_2$ in the exhaust gas are reduced by the second catalytic particle with higher efficiency and converted into $N_2$, $H_2O$, and the like, thereby resultingly enabling to decrease an emission amount of NOx into the atmosphere. As a result, both the first and second catalytic particles are capable of cooperatively decreasing NOx contained in the exhaust gas over a wide range of 150 to 700° C., with higher efficiency.

EFFECT OF THE INVENTION

According to the present invention, the first catalytic layer comprising an iron-zeolite catalyst exhibits catalytic activity to decrease 60% or more of NOx contained in the exhaust gas at low temperatures, the second catalytic layer stacked on the exhaust-gas downstream-side surface of the first catalytic layer and comprising an iron-alumina catalyst or the like exhibits catalytic activity to decrease 60% or more of NOx contained in the exhaust gas at temperatures higher than the temperature range where the first catalytic layer exhibits the catalytic activity, and both the first and second catalytic layers cooperatively exhibit catalytic activity to decrease 70% or more of NOx contained in the exhaust gas within an exhaust-gas temperature range of 150 to 700° C. Thus, when the exhaust gas flows into the first catalytic layer together with ammonia at low temperatures of the exhaust gas, the ammonia functions as a reducing agent, so that NOx in the exhaust gas is reduced by the first catalytic layer with higher efficiency, thereby enabling to decrease an emission amount of NOx into the atmosphere. In turn, when the exhaust gas is elevated in temperature, the excessive ammonia having been trapped in the first catalytic layer is released from the first catalytic layer, and flows into the second catalytic layer, together with the ammonia derived from hydrolysis of a urea-based liquid supplied into the exhaust passage, so that NOx in the exhaust gas is reduced by the second catalytic layer with higher efficiency, thereby enabling to decrease an emission amount of NOx into the atmosphere. This resultingly enables to ensure a NOx decreasing capability over a wide temperature range from low to high temperatures of exhaust gas between 150 and 700° C.

Further, since the second catalytic layer is stacked on each of the exhaust-gas upstream-side surfaces of the partitions and the first catalytic layer is stacked on the surface of the second catalytic layer, it becomes possible to ensure a NOx decreasing capability over a wide temperature range from low to high temperatures of exhaust gas. Moreover, even when the interior of the carrier is brought into a high-temperature hydrothermal environment upon combustion of particulates accumulated in the carrier such that the first catalytic layer comprising an iron-zeolite catalyst is somewhat degraded, the second catalytic layer comprising an iron-alumina catalyst or the like is interposedly provided which is insusceptible to be degraded under the high-temperature hydrothermal condition and exhibits excellent performance at high temperatures, so that the performance in the high temperature range is rarely deteriorated.

Furthermore, the first catalytic particle comprising an iron-zeolite catalyst exhibits catalytic activity to decrease 60% or more of NOx contained in the exhaust gas at low temperatures, the second catalytic particle comprising an iron-alumina catalyst or the like exhibits catalytic activity to decrease 60% or more of NOx contained in the exhaust gas at temperatures higher than the temperature range where the first catalytic particle exhibits the catalytic activity, and both the first and second catalytic particles cooperatively exhibit catalytic activity to decrease 70% or more of NOx contained in the exhaust gas within an exhaust-gas temperature range of 150 to 700° C. Thus, when the exhaust gas flows into or contacts with the first catalytic particle together with ammonia at low temperatures of the exhaust gas, the ammonia functions as a reducing agent, so that NOx in the exhaust gas is reduced by the first catalytic particle with higher efficiency, thereby enabling to decrease an emission amount of NOx into the atmosphere. In turn, when the exhaust gas is elevated in temperature, the excessive ammonia having been trapped in the first catalytic particle is released from the first catalytic particle, and flows into or contacts with the second catalytic particle near the first catalytic particle, together with the ammonia derived from hydrolysis of a urea-based liquid supplied into the exhaust passage, so that NOx in the exhaust gas is reduced by the second catalytic particle with higher efficiency, thereby enabling to decrease an emission amount of NOx into the atmosphere. This resultingly enables to ensure a NOx decreasing capability over a wide temperature range from low to high temperatures of exhaust gas between 150 and 700° C.

BEST MODE(S) FOR CARRYING OUT THE INVENTION

Figure 2:
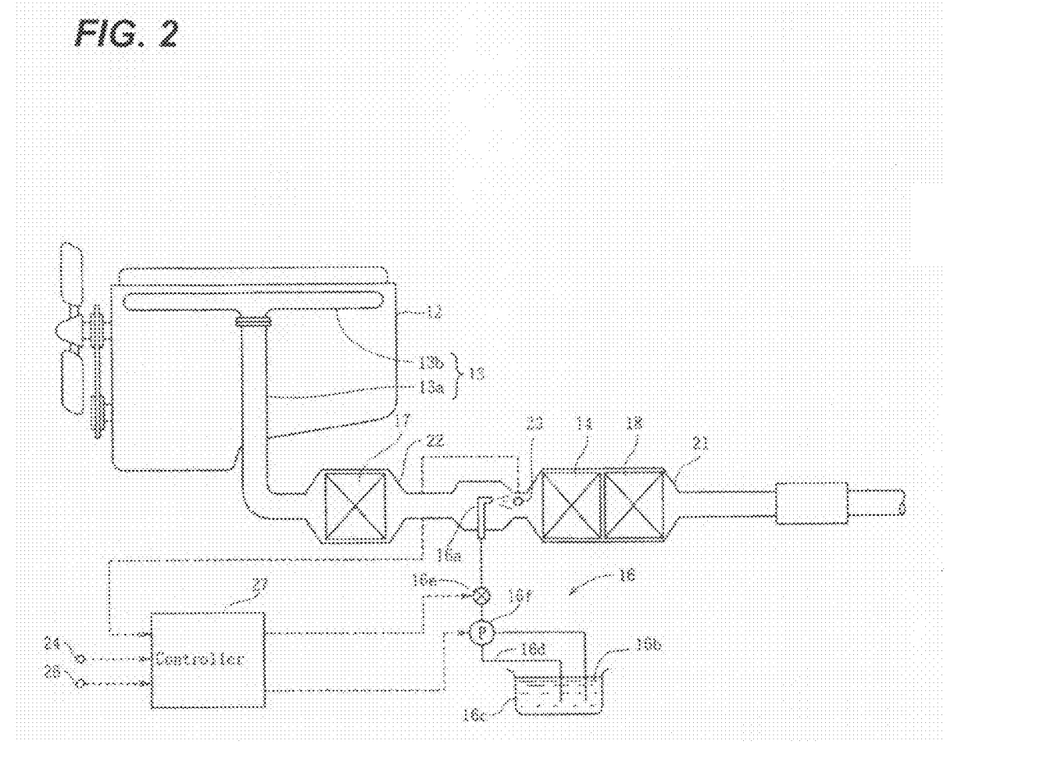
FIG. 2 is a constitutional view of an exhaust-gas purifying apparatus including the catalyst.

The best mode for carrying out the present invention will be described with reference to the drawings. As shown in FIG. 1 and FIG. 2, reference numeral 11 designates a selective reduction catalyst stacked on partitions 14b of a carrier 14a of a filter 14 accommodated in a first catalytic converter 21 in an exhaust pipe 13a of a diesel engine 12. Specifically, the selective reduction catalyst 11 comprises a first catalytic layer 11a formed to be porous for allowing an exhaust gas to pass therethrough, and a second catalytic layer 11b formed to be porous for allowing an exhaust gas to pass therethrough and stacked on the exhaust-gas downstream-side surface of the first catalytic layer 11a (FIG. 1). In this embodiment, the first catalytic layer 11a comprises an iron-zeolite catalyst and the second catalytic layer 11b comprises an iron-alumina catalyst. The iron-zeolite catalyst constituting the first catalytic layer 11a is a catalyst which is provided by exchanging Na ions of Na type ZSM-5 zeolite or beta zeolite with Fe ions. The first catalytic layer 11a exhibits catalytic activity to decrease 60% or more of NOx contained in an exhaust gas within an exhaust-gas temperature range of 150 to 400° C. In turn, the iron-alumina catalyst constituting the second catalytic layer 11b is a catalyst, which is provided by substituting hydroxyl groups at the surface of alumina with iron, or which comprises alumina carrying iron (including oxides of iron) in states attached to the predetermined site of the surface of alumina. The second catalytic layer 11b exhibits catalytic activity to decrease 60% or more of NOx contained in an exhaust gas within an exhaust-gas temperature range of 400 to 700° C. which range is higher than the temperature range where the first catalytic layer 11a exhibits the catalytic activity. Note that the second catalytic layer is not required to be an iron-alumina catalyst, and may be an iron-zirconia catalyst, iron-ceria catalyst, or iron-titania, or may be a mixed catalyst or a complex oxide catalyst comprising two or more kinds selected from a group consisting of iron-alumina, iron-zirconia, iron-ceria, and iron-titania.

Meanwhile, the exhaust pipe 13a is connected to exhaust ports of the diesel engine 12 through an exhaust manifold 13b, such that the exhaust manifold 13b and the exhaust pipe 13a constitute an exhaust passage 13 (FIG. 1). The exhaust pipe 13a is provided with the first catalytic converter 21 having a diameter larger than that of the exhaust pipe, and the filter 14 having the selective reduction catalyst 11 stacked thereon is accommodated in the first catalytic converter 21. The filter 14 comprises: the carrier 14a having multiple through-holes 14c divided off by the porous partitions 14b and mutually parallelly extended in a longitudinal direction of the exhaust pipe 13a; and plug members 14f for alternately plugging mutually adjacent inlet portions 14d and mutually adjacent outlet portions 14e of these through-holes 14c, respectively. This carrier 14a comprises a porous body capable of passing an exhaust gas therethrough and made of a ceramic such as cordierite, silicon carbide, or the like. The second catalytic layer 11b is stacked on each of the exhaust-gas upstream-side surfaces of the partitions 14b. The second catalytic layer 11b is formed by: dispersing an alumina powder into a water solution of iron nitrate, for example, to prepare a slurry; immersing those surfaces of the partitions 14b which are faced to an exhaust gas inlet side of the carrier 14a, into the slurry; and removing an excessive slurry from the carrier 14a, to ensure a ventilation therethrough; followed by drying and firing. In turn, the first catalytic layer 11a is formed on the surface of the second catalytic layer 11b. The first catalytic layer 11a is formed by: immersing an Na type zeolite powder (Na-ZSM5) into a water solution of iron nitrate, for example, to prepare a slurry; immersing those surfaces of the partitions 14b which are faced to the exhaust gas inlet side of the carrier 14a, into the slurry; and removing an excessive slurry from the carrier 14a, to ensure a ventilation therethrough; followed by drying and firing.

Inserted into the exhaust pipe 13a at an exhaust-gas upstream-side relative to the filter 14, is a liquid injection nozzle 16a of liquid supplying means 16. The liquid supplying means 16 includes: the liquid injection nozzle 16a for injecting a urea-based liquid 16b toward the selective reduction catalyst 11; a liquid tank 16c for preserving the urea-based liquid 16b therein; a liquid supply pipe 16d for intercommunicating between the liquid tank 16c and the liquid injection nozzle 16a; a liquid regulation valve 16e provided in the liquid supply pipe 16d to regulate a flow rate of the urea-based liquid 16b to the liquid injection nozzle 16a; and a liquid pump 16f provided in the liquid supply pipe 16d between the liquid regulation valve 16e and liquid tank 16c, and configured to pump the urea-based liquid 16b in the liquid tank 16c to the liquid injection nozzle 16a. Although the urea-based liquid 16b is preferably provided by adopting an aqueous urea solution, it is also possible to adopt an aqueous ammonia solution, an ammonia-inducing substance, or the like. Further, the liquid regulation valve 16e is configured to be capable of varying an opening degree of the liquid supply pipe 16d to regulate the flow rate of the urea-based liquid 16b to the liquid injection nozzle 16a.

Meanwhile, provided in the exhaust pipe 13a at an exhaust-gas upstream-side relative to the liquid injection nozzle 16a, is a second catalytic converter 22, which accommodates an oxidation catalyst 17 therein. This oxidation catalyst 17 exemplarily comprises a platinum-zeolite catalyst, a platinum-alumina catalyst, or the like coated on surfaces of passages formed through a monolith carrier (material: cordierite), which passages are arranged in a latticed pattern (honeycomb pattern) and extended in a longitudinal direction of the exhaust pipe 13a. Further, accommodated in the second catalytic converter 22 at an exhaust-gas downstream-side relative to the filter 14, is an ammonia oxidation catalyst 18. This ammonia oxidation catalyst 18 is one comprising: a carrier such as alumina, zeolite, or the like; and a noble metal element, a base metal, or the like carried thereon.

Inserted into the exhaust pipe 13a at an exhaust-gas upstream-side relative to the filter 14 and at an exhaust-gas downstream-side relative to the liquid injection nozzle 16a, is a temperature sensor 23 for detecting a temperature of an exhaust gas; a crankshaft of the diesel engine 12 is provided with a rotation sensor 24 for detecting a rotational speed of the crankshaft; and there is an accelerator pedal (not shown) provided with a load sensor 26 for detecting a load of the engine 12 by detecting a pressed amount of the accelerator pedal. The temperature sensor 23, rotation sensor 24, and load sensor 26 have detection outputs connected to control inputs of a controller 27 comprising a microcomputer, respectively, and the controller 27 has control outputs connected to the liquid regulation valve 16e and liquid pump 16f, respectively. The rotation sensor 24 and the load sensor 26 cooperatively constitute operational status detecting means. Further, the controller 27 is provided with a memory which previously stores therein the opening degree of the liquid regulation valve 16e and an operation/inoperation of the liquid pump 16f corresponding to an exhaust gas temperature, an engine rotation, and an engine load, in a form of map. Further, the controller 27 is configured to: ascertain the operational status of the diesel engine 12, based on the respective detection outputs of the temperature sensor 23, rotation sensor 24, and load sensor 26; and control the liquid regulation valve 16e and liquid pump 16f, according to a condition stored in the memory corresponding to the operational status, to thereby cause the liquid injection nozzle 16a to inject an optimum amount of the urea-based liquid 16b at a predetermined moment, in response to the operational status.

The exhaust-gas purifying apparatus and the selective reduction catalyst 11 configured in the above way will be explained for operations thereof. The exhaust gas from the diesel engine 12 flows through the exhaust manifold 13b and exhaust pipe 13a, and into the oxidation catalyst 17. Part of nitrogen monoxide (NO) in the exhaust gas is oxidized into nitrogen dioxide ($NO_2$) by the oxidation catalyst 17, so that the exhaust gas is improved in a component ratio between NO and $NO_2$ and then flows into the selective reduction catalyst 11. When the temperature sensor 23 detects that the exhaust gas temperature is low and between 150 to 400° C., the controller 27 controls the liquid pump 16f and liquid regulation valve 16e based on the detection output of the temperature sensor 23 and the detection outputs of the rotation sensor 24 and load sensor 26, to thereby supply an optimum amount of urea-based liquid 16b into the exhaust pipe 13a. The urea-based liquid 16b supplied into the exhaust pipe 13a is hydrolyzed to produce ammonia, such that the exhaust gas flows into the first catalytic layer 11a together with the ammonia. At this time, the ammonia functions as a reducing agent, so that NO and $NO_2$ in the exhaust gas, which has been improved in the component ratio by the oxidation catalyst 17, are reduced by the first catalytic layer 11a with higher efficiency and converted into $N_2$, $H_2O$, and the like. This resultingly enables to decrease an emission amount of NOx into the atmosphere. Note that the excessive ammonia ($NH_3$) is trapped by the first catalytic layer 11a, without reacting with NOx.

Meanwhile, when the exhaust gas temperature is elevated up to 400° C. or higher, the excessive ammonia having been trapped in the first catalytic layer 11a is released from the first catalytic layer 11a. Further, when the temperature sensor 23 detects that the exhaust gas temperature is high and at 400° C. or higher, the controller 27 controls the liquid pump 16f and liquid regulation valve 16e based on the detection output of the temperature sensor 23 and the respective detection outputs of the rotation sensor 24 and load sensor 26, to thereby supply an optimum amount of urea-based liquid 16b into the exhaust pipe 13a. The urea-based liquid 16b supplied into the exhaust pipe 13a is hydrolyzed to produce ammonia, such that the exhaust gas flows into the second catalytic layer 11b together with the thus hydrolyzedly produced ammonia and the ammonia released from the first catalytic layer 11a. Although a relatively large amount of ammonia is required for the second catalytic layer 11b to exhibit higher catalytic activity at high temperatures, ammonia in the relatively large amount as described above is caused to flow into the second catalytic layer 11b, so that NO and $NO_2$ in the exhaust gas having been improved in component ratio by the oxidation catalyst 17 are reduced by the second catalytic layer 11b with higher efficiency and converted into $N_2$, $H_2O$, and the like. This resultingly enables to decrease an emission amount of NOx into the atmosphere. Thus, both the first and second catalytic layers 11a and 11b cooperatively exhibit catalytic activity to decrease 70% or more of NOx contained in the exhaust gas over exhaust gas temperatures within a range of 150 to 700° C., thereby enabling to ensure a NOx decreasing capability over a wide temperature range from low to high temperatures of exhaust gas between 150 and 700° C.

Further, redundant ammonia, if any, having passed through the selective reduction catalyst 11 is oxidized by the ammonia oxidation catalyst 18 into nitrogen, which is harmless even when emitted into the atmosphere. Moreover, when particulates in an exhaust gas are accumulated up to a predetermined amount in the carrier 14a of the filter 14, the carrier 14a is supplied with a fuel by post-injection, after-injection, or the like, to combust the particulates. Upon this combustion, hydrogen contained in the fuel is turned into a water vapor, so that the interior of the carrier 14a is brought into an environment, which is hot and pervaded with a water vapor. Although the iron-zeolite catalyst is somewhat degraded under this high-temperature hydrothermal condition, the second catalytic layer 11b comprising the iron-alumina catalyst or the like is interposedly provided which is insusceptible to be degraded under the high-temperature hydrothermal condition and exhibits excellent performance at high temperatures. Thus, the performance in the high temperature range is rarely deteriorated.

Note that, although the second catalytic layer is stacked on each of the exhaust-gas upstream-side surfaces of the partitions and the first catalytic layer is stacked on the surface of the second catalytic layer in the above embodiment, it is also possible to constitute a selective reduction catalyst by mixing a first catalytic particle formed to be porous for allowing an exhaust gas to pass therethrough, with a second catalytic particle formed to be porous for allowing an exhaust gas to pass therethrough. The first catalytic particle is constituted of the same composition as that of the first catalytic layer in the above embodiment, and the second catalytic particle is constituted of the same composition as that of the second catalytic layer in the above embodiment.

Meanwhile, in the selective reduction catalyst configured in the above-described way, when the exhaust pipe is supplied with a urea-based liquid at a low exhaust gas temperature between 150 to 400° C., the urea-based liquid is hydrolyzed to produce ammonia. When the exhaust gas together with the ammonia flows into or contacts with first catalytic particle, the ammonia functions as a reducing agent, so that NO and $NO_2$ in the exhaust gas are reduced by the first catalytic particle with higher efficiency and converted into $N_2$, $H_2O$, and the like. This resultingly enables to decrease an emission amount of NOx into the atmosphere. At this time, the excessive ammonia ($NH_3$) is trapped by the first catalytic particle, without reacting with NOx. Meanwhile, when the exhaust gas temperature is elevated up to 400° C. or higher, the excessive ammonia having been trapped in the first catalytic particle is released from the first catalytic particle, and flows into or contacts with second catalytic particle near the first catalytic particle, together with the ammonia derived from hydrolysis of a urea-based liquid supplied into the exhaust pipe. Although a relatively large amount of ammonia is required for the second catalytic particle to exhibit higher catalytic activity at high temperatures, ammonia in the relatively large amount as described above is caused to flow into or contact with the second catalytic particle, so that NO and $NO_2$ in the exhaust gas are reduced by the second catalytic particle with higher efficiency and converted into $N_2$, $H_2O$, and the like. This resultingly enables to decrease an emission amount of NOx into the atmosphere. Thus, both the first and second catalytic particles cooperatively exhibit catalytic activity to decrease 70% or more of NOx contained in the exhaust gas over exhaust gas temperatures within a range of 150 to 700° C., thereby enabling to ensure a NOx decreasing capability over a wide temperature range from low to high temperatures of exhaust gas between 150 and 700° C.

EXAMPLE

The present invention will be explained in detail based on Example thereof, together with Comparative Examples.

Example 1

As shown in FIG. 1 and FIG. 2, the exhaust pipe 13a of the diesel engine 12 was provided with the oxidation catalyst 17, the filter 14 including the selective reduction catalyst 11 stacked thereon, and the ammonia oxidation catalyst 18, in the order from the exhaust-gas upstream-side. The second catalytic layer 11b of the selective reduction catalyst 11 was stacked on each of the exhaust-gas upstream-side surfaces of the partitions 14b of the filter 14, and the first catalytic layer 11a was stacked on the surface of the second catalytic layer 11b. Further, the liquid injection nozzle 16a for injecting the urea-based liquid 16b was provided in the exhaust pipe 13a between the oxidation catalyst 17 and the selective reduction catalyst 11. Note that the oxidation catalyst 17 was formed by carrying platinum on alumina. The carrier 14a of the filter 14 was formed of cordierite to be porous. The first catalytic layer 11a of the selective reduction catalyst 11 was formed of an iron-zeolite catalyst and the second catalytic layer 11b was formed of an iron-alumina catalyst. Further, the ammonia oxidation catalyst 18 was formed by carrying platinum on alumina. This exhaust-gas purifying apparatus was identified to be Example 1.

Comparative Example 1

This was constituted in the same manner as Example 1, except that only the first catalytic layer comprising an iron-zeolite catalyst was stacked on each of the exhaust-gas upstream-side surfaces of the partitions of the filter without using the second catalytic layer comprising an iron-alumina catalyst. This exhaust-gas purifying apparatus was identified as Comparative Example 1.

Comparative Example 2

This was constituted in the same manner as Example 1, except that only the second catalytic layer comprising an iron-alumina catalyst was stacked on each of the exhaust-gas upstream-side surfaces of the partitions of the filter without using the first catalytic layer comprising an iron-zeolite catalyst. This exhaust-gas purifying apparatus was identified as Comparative Example 2.

Comparative Test and Evaluation

Figure 3:
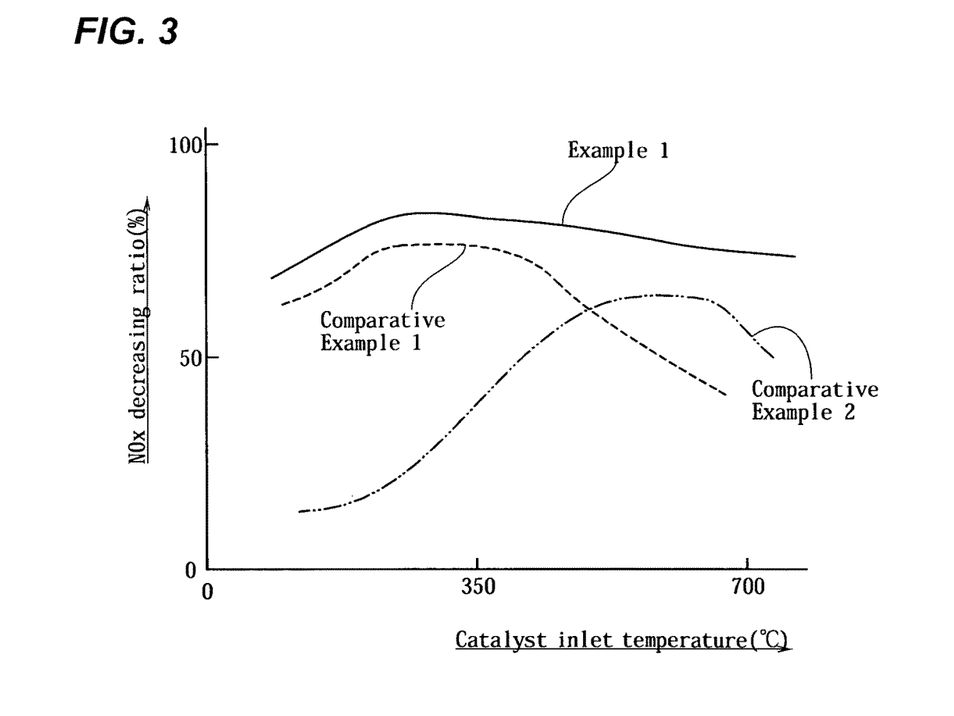
FIG. 3 is a graph showing transitions of NOx decreasing ratios relative to a change of a catalyst inlet temperature, in Example 1, and Comparative Examples 1 and 2, respectively.

NOx decreasing ratios by the exhaust-gas purifying apparatuses of Example 1, and Comparative Examples 1 and 2 were measured by changing exhaust gas temperatures, respectively. The results thereof are shown in FIG. 3. As apparent from FIG. 3, in Comparative Example 1, although the NOx decreasing ratio exhibited relatively large values of 75% at exhaust gas temperatures of 200 to 350° C., the NOx decreasing ratio was low at exhaust gas temperatures of 500° C. or higher; while in Comparative Example 2, although the NOx decreasing ratio exhibited relatively large values of about 65% at exhaust gas temperatures of 400° C. or higher, the NOx decreasing ratio was low at exhaust gas temperatures of 300° C. or lower. Contrary, Example 1 was recognized to be capable of decreasing NOx with higher efficiency to attain a NOx decreasing ratio of 70% or more, throughout exhaust gas temperatures of 150 to 700° C.

INDUSTRIAL APPLICABILITY

The present invention can be applied to a selective reduction catalyst for decreasing nitrogen oxides contained in an exhaust gas of a diesel engine by reacting the nitrogen oxides with a urea-based liquid.

The invention claimed is:

1. A selective reduction catalyst for decreasing NOx contained in an exhaust gas of a diesel engine by reacting NOx with a urea-based liquid comprising:

a first catalytic layer, which is provided in an exhaust passage of the diesel engine, and which is formed to be porous for allowing an exhaust gas together with ammonia derived from hydrolysis of the urea-based liquid to pass therethrough; and a second catalytic: layer, which is stacked on exhaust-gas downstream-side surface of the first catalytic layer, and which is formed to be porous for allowing the exhaust gas together with ammonia released from the first catalytic layer to pass therethrough;

wherein the first catalytic layer a comprises an iron-zeolite catalyst to exhibit catalytic activity by the function of the ammonia as a reducing agent to decrease 60% or more of NOx contained in the exhaust gas within an exhaust-gas temperature range of 150 to 400° C.;

wherein the second catalytic layer comprises one or more kinds of a single catalyst, a mixed catalyst, and a complex oxide catalyst selected from a group consisting of iron-alumina, iron-zirconia, iron-ceria, and iron-titania, in a manner to exhibit catalytic activity by the function of the ammonia as a reducing agent to decrease 60% or more of NOx contained in the exhaust gas within an exhaust-gas temperature range of 400 to 700° C. which range is higher than the temperature range where the first catalytic layer exhibits the catalytic activity; and wherein both the first and second catalytic layers cooperatively exhibit catalytic activity to decrease 70% or more of NOx contained in the exhaust gas within an exhaust-gas temperature range of 150 to 700 ° C.

2. The selective reduction catalyst of claim 1, wherein the exhaust passage is provided with a carrier therein, and the carrier a has multiple through-holes divided off by porous partitions and mutually parallelly extended in a longitudinal direction of the exhaust passage; and wherein the second catalytic layer is stacked on each of the exhaust-gas upstream-side surfaces of the partitions and the first catalytic layer is stacked on the surface of the second catalytic layer.

3. A selective reduction catalyst for decreasing NOx contained in an exhaust gas of a diesel engine by reacting NOx with a urea-based liquid comprising:

a first catalytic particle, which is provided in an exhaust passage of the diesel engine, and which is formed to be porous for allowing an exhaust gas together with ammonia derived from hydrolysis of the urea-based liquid to pass therethrough; and a second catalytic particle, which is mixed with the first catalytic particle, and which is formed to be porous for allowing the exhaust gas together with ammonia released from the first catalytic particle to pass therethrough;

wherein the first catalytic particle comprises an iron-zeolite catalyst to exhibit catalytic activity by the function of the ammonia as a reducing agent to decrease 60% or more of NOx contained in the exhaust gas within an exhaust-gas temperature range of 150 to 400° C.;

wherein the second catalytic particle comprises one or more kinds of a single catalyst, a mixed catalyst, and a complex oxide catalyst selected from a group consisting of iron-alumina, iron-zirconia, iron-ceria, and iron-titania, in a manner to exhibit catalytic activity by the function of the ammonia as a reducing agent to decrease 60% or more of NOx contained in the exhaust gas within an exhaust-gas temperature range of 400 to 700° C. which range is higher than the temperature range where the first catalytic particle exhibits the catalytic activity; and wherein both the first and second catalytic particles cooperatively exhibit catalytic activity to decrease 70% or more of NOx contained in the exhaust gas within an exhaust-gas temperature range of 150 to 700° C.

\* \* \* \* \*